United States Patent [19]

Locker et al.

[11] Patent Number: 4,833,295
[45] Date of Patent: May 23, 1989

[54] WELDING OF PARTS SEPARATED BY A GAP USING A LASER WELDING BEAM

[75] Inventors: Richard W. Locker, Livonia; Philip P. Chan, Canton; Paramjit S. Nagi, Livonia, all of Mich.

[73] Assignee: Ford Motor Company, Dearborn, Mich.

[21] Appl. No.: 194,749

[22] Filed: May 17, 1988

[51] Int. Cl.$^4$ .............................................. B23K 26/00
[52] U.S. Cl. ............................ 219/121.63; 219/121.13
[58] Field of Search ...................... 219/121.63, 121.64, 219/121.13, 121.14, 121.45, 121.46, 121.78, 121.82

[56] References Cited

U.S. PATENT DOCUMENTS 3,949,186 9/1976 Nakayama et al. ............. 219/121.14

Primary Examiner—C. L. Albritton
Attorney, Agent, or Firm—Frank G. McKenzie; Donald J. Harrington

[57] ABSTRACT

A method for welding two portions of a cover for a torque converter at an overlap joint using a welding beam includes directing the welding beam at the radially outer cover in the vicinity of the overlap at an acute angle with the plane of the over portions in the vicinity of the overlap. The angle is chosen so that the focal point of the welding beam is located on the radially outermost cover portion near the inner surface and distant from the outer surface. In this way, before fusion occurs, temperature gradients are induced through the thicknesses of the cover portions tending to reduce radial expansion of the outer cover and increase radial expansion of the inner cover. The effect of these thermal bending moments and the effect of the increase in mean temperature of the covers due to the welding beam combine to reduce or eliminate the thickness of the gap that exists before welding begins. The covers are held in position and moved relative to the welding beam at a rate that permits a hydraulically tight weld of high strength to be made between the covers.

21 Claims, 2 Drawing Sheets

WELDING OF PARTS SEPARATED BY A GAP USING A LASER WELDING BEAM

BACKGROUND OF THE INVENTION

1. Field of the Invention

This invention relates to metal welding using high energy beams such as laser beams and electron beams. More particularly, it pertains to seam welding especially joints that connect and seal cover portions of a torque converter.

2. Description of the Prior Art

Conventionally, torque converters for automotive transmissions include two cover portions, an impeller housing and converter cover, joined by fillet welding along a seam where the covers overlap. The weld is made by heat produced by an electric arc welding gun operated in an inert gas atmosphere using metal inert gas (MIG) weld techniques. Filler wire, melted and fused to molten metal of the cover and housing, is added to the parent metal and provides material for the fillet.

Before welding, the cover and housing are formed from high strength, low alloy steel to the desired shape in a press having an enormous force capacity—perhaps 3500 tons or more. In the process of forming the cover and housing with great forming pressures produced in the press, residual stresses of substantial magnitude are induced and remain in the parts after forming. Conventional welding, such as MIG welding, causes a large temperature spreading over a large area adjacent the seam that connects the cover and housing. The high temperature releases the residual stresses induced while forming and causes distortion of the cover and housing as the residual stresses are relieved by the heat of welding.

In a motor vehicle, the assembly formed by welding the cover and housing rotates at the high speed of the engine that drives the vehicle. Acceptable performance in this environment requires an accurate, dynamic balance of the torque converter about the axis of rotation. To assure satisfactory balance after forming and welding the torque converter, weights are riveted to the outer surface of the cover to restore the balance of the torque converter assembly within an acceptable range of balance established by performance criteria. Both the distortion that results from overcoming the residual stresses and the addition of the filler wire required by conventional weld processes operate to disturb the initial balance of the torque converter and require greater correcting balance weight and more attention to the dynamic balance than would be required if these undesirable effects of the conventional weld process could be eliminated.

Necessary manufacturing and assembly tolerances required to produce the impeller housing and converter cover and to assemble these with a lap joint cause a gap between the inner surface of the housing and the outer surface of the cover in the region where they overlap and a seam is to be formed. The location of the inner surface of the outer member at the overlap can vary over a tolerance range for that member, and the location of the outer surface of the inner member at the overlap can vary over a tolerance range for that member. Consequently, the width of the gap will vary in accordance with the combination of tolerance ranges associated with the cover and housing to be joined by welding. Where electric arc welding is used, the presence of the gap presents no serious difficulty. The large amount of heat produced, the broad zone of elevated temperature that results and the use of filler wire provide a sufficient amount of molten metal to span the gap and make an effective joint.

However, where a welding beam, focused on a small area or at a point, is used to make the weld and no filler wire is used, as in the present invention, the presence of a gap presents a serious difficulty. Yet a gap before welding is essential because of the tolerances required to assure assembly of the cover and housing.

The assembly comprises a shell containing transmission fluid under pressure. Therefore, the seam weld between the cover and housing must produce a leak-free seal with respect to hydraulic fluid. Also, the rate at which the weld is made should be as fast as possible consistent with these requirements.

SUMMARY OF THE INVENTION

Seam welds made by the method of the present invention use a welding beam, preferably a laser beam, directed at a shallow angle with respect to the portion of the impeller housing and converter cover which overlap in the vicinity of the weldment. The angle is selected so that the beam is directed onto the outer member at the overlap, usually the impeller housing. The focal region of the beam is located on the wall of the outer member approximately one-third of the distance from its inner surface to its outer surface, i.e., 0.5–1.7 mm. The focal region is further located sufficiently far from the free edge of the impeller housing so that the length of the welded nugget that results is at least equal to the wall thickness of the impeller housing or converter cover. When the nugget is this long, experience with destructive testing of the joint shows that failure is more likely through the thickness of the housing or cover than in the weld.

Locating the welding beam on the outer housing as described above induces a temperature variation or gradient through the wall thickness of the housing and another temperature gradient through the wall thickness of the cover. The temperature gradient in the housing wall is such that higher temperatures are produced near the focal region and the inner surface, and lower temperatures at the outer surface. The temperature gradient in the cover wall is such that higher temperatures occur at its outer surface and lower temperatures at the inner surface. These thermal gradients induce thermal bending moments through the thickness of the respective components tending to restrain outward thermal expansion of the housing and to cause greater outward thermal expansion of the cover than would occur if the gradients were absent. These gradients reduce the width of the initial gap.

If, on the other hand, the focal region were located near the midpoint of the housing wall thickness in the lap region, the temperature variation through the thickness would be more nearly uniform. Then the housing wall would expand radially outward due mainly to elevated temperature but without substantial thermal bending effects, thereby tending to increase the width of the gap. But locating the focal region of the beam according to the present invention induces a thermal bending moment that restrains this outward expansion, thereby reducing the size of the gap. Furthermore, a thermal gradient through the thickness of the cover increases outward radial expansion of the cover, and this also reduces the width of the gap. These conditions combine with the effect of elevated temperature of the cover and housing to reduce, minimize or completely eliminate the size of the gap present at ambient temperature when the housing and cover are overlapped and assembled prior to welding.

The torque converter, which weighs approximately 40 pounds, is rotated at relatively high speed after welding to determine its dynamic balance about the axis of symmetry. To correct unacceptable imbalance, weights are fixed to its outer surface. The welding process according to the present invention employs no additional filler wire to make the weld and requires substantially less heat than conventional welding methods. Accordingly, the amount of the metal that becomes molten is minimized, its location after welding is accurately predictable, and it has virtually no adverse effect on balance. For these reasons, when the joint is made in this way, substantially less balance weight and time are required after welding to rebalance the torque converter assembly.

The torque converter after assembly and before welding is held in a fixture and supported for rotation about an axis of symmetry. The cover and housing are rotated as a unit about the axis of symmetry with respect to the axis of the welding beam so that a seam weld is made along the entire periphery having a diameter of approximately 9–13 inches. The welding speed is approximately 50–80 inches per minute. When the technique of this invention is employed to make a weld, the size of the gap at ambient temperature is preferably in the range ±0.0–0.020 inches. The laser beam weld is performed in a gaseous atmosphere of $N_2O_2$ helium or argon, or a mixture of these located in the vicinity of the welding beam but necessarily confined to that vicinity.

DESCRIPTION OF THE PREFERRED EMBODIMENT

Figure 1:
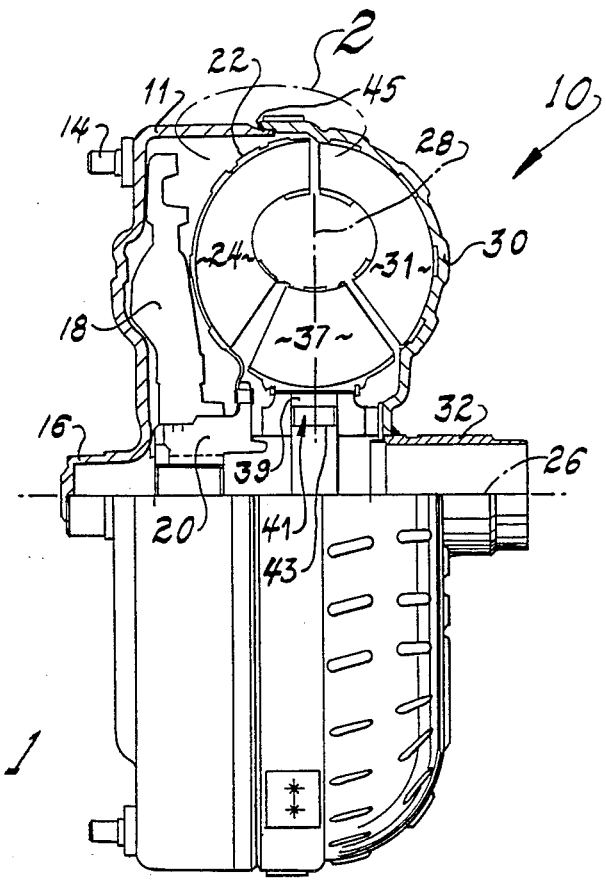
FIG. 1 is a partial cross section through a hydrokinetic torque converter showing a seam weld connecting a converter cover and an impeller housing.

Referring first to FIG. 1, an automotive torque converter 10 for an automatic transmission includes a cover 11 adapted for connection by a mechanical attachment 14 to a flywheel (not shown) adapted to be driven by an engine crankshaft. The cover is supported on a surface 16 adapted to fit within a recess formed on the end of the engine shaft. A lockup clutch 18 is rotatably supported on the hub 20 of a turbine rotor 22, which includes multiple turbine blades 24, rotatably supported on the hub and distributed angularly about a longitudinal axis 26 extending along the length of the torque converter parallel to the engine shaft and perpendicular to a transverse axis 28. Following assembly, the torque converter is substantially symmetric about axis 26.

An impeller housing 30 is carried on an impeller shaft and contains multiple impeller blades 31 spaced from one another angularly about axis 26. The impeller blades are fixed mechanically to the impeller housing so that the blades and the housing rotates as a unit about the longitudinal axis.

A reactor assembly includes multiple stator blades 37 connected to the outer member 39 of a one-way clutch 41, whose inner member 43 is adapted to be assembled to the outer surface of a transmission input shaft (not shown), whereby a one-way driving connection is made by the clutch 41 to the input shaft.

The impeller housing and torque converter cover are overlapped and joined by a weld 45 that extends around the periphery of the housing and cover, thereby forming a seam that seals the space within the housing and cover assembly and prevents the flow of hydraulic fluid past the weld.

Figure 2:
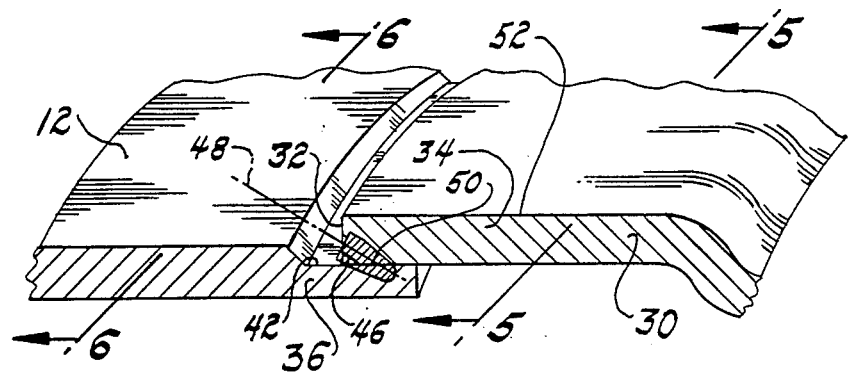
FIG. 2 is a cross section in substantially larger scale than FIG. 1 showing the assembly in the vicinity of the seam weld.

FIG. 2 shows the impeller housing is located radially outward of the converter cover in the vicinity of the lap joint where the weld is made.

Figure 3:
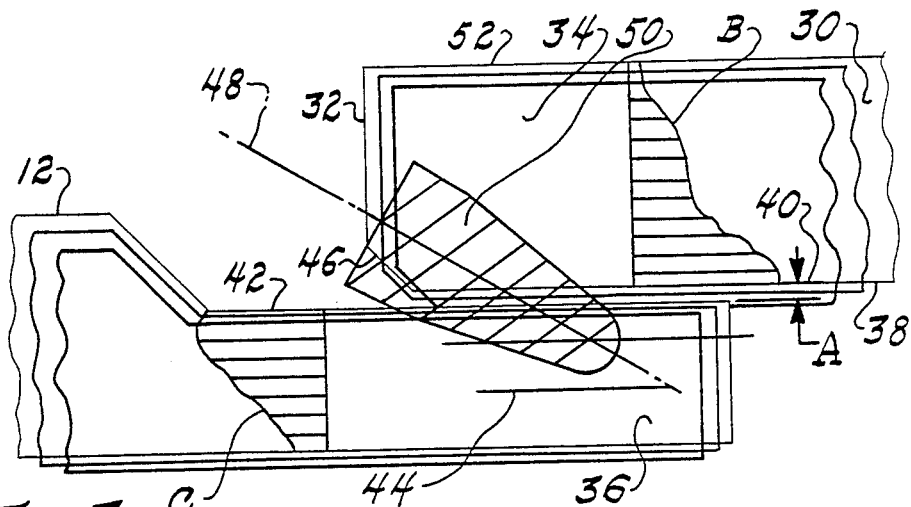
FIG. 3 is a cross section through the seam weld showing a first angle of incidence of the welding beam.
Figure 4:
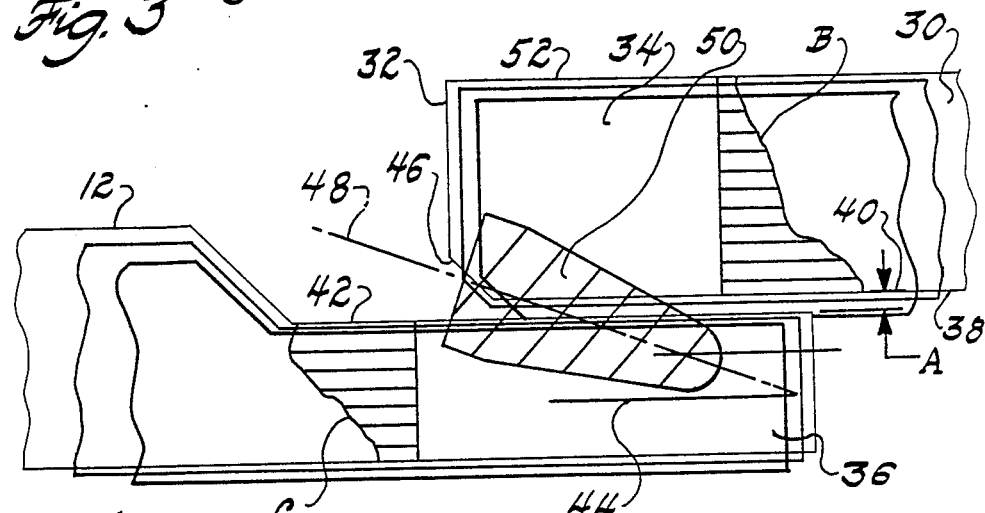
FIG. 4 is a cross section of the seam weld showing a greater angle of incidence of the welding beam than that of FIG. 3.

FIGS. 3 and 4 show in greater detail the configuration of the lap joint at the weld seam. The impeller housing defines a first sheet 34 having a uniform thickness terminating at an edge 32 substantially perpendicular to the plane of the first sheet. The converter cover defines a second sheet 36 located radially inward from the first sheet, overlapped by the first sheet in the vicinity of the weld and having a substantially planar, uniform, but reduced thickness in comparison to other portions of the cover. These figures show three locations for the housing and the cover. Two of the locations represent the position of the housing and cover at the extremities of the tolerances. The third location, between the extremities, represents the nominal tolerance position of the housing and cover. A gap A between the sheets is a maximum when the radially innermost surface 38 of the first sheet is located at the maximum tolerance position and the outer surface 40 of the second sheet is located at the minimum tolerance position. The edge may include a corner relief 46 to facilitate assembly by inserting the cover within the housing to produce the lap joint.

The relative positions of the impeller housing and converter cover shown in FIGS. 3 and 4 are held in position by fixing these components to rigid tooling throughout the welding process. The tooling permits rotation of the entire assembly about axis 26 with respect to a welding beam 48 directed at the first sheet and having an angle of inclination with respect to the plane of the first sheet in the range 10°–45°. The welding beam is preferably a laser beam produced by a conventional, commercially-available welder, such as model No. 975 produced by Spectra-Physics, Inc., San Jose, Calif. The welder is supplied with electrical welding energy in the range 5–15 kilowatts. The assembly is rotated about the axis 26 and with respect to the welding beam at a rate in the range 50–80 inches per minute.

The welding gun directs a substantially conical laser beam toward the assembly. The beam is truncated by its intersection with the housing so that it has a diameter of approximately 0.030–0.040 inches there, or another dimension suitable for welding the metal. The distance from the apex of the beam to its plane of contact with the first sheet, a region called the focal region, is located on the first sheet and at a distance from edge 32 such that the weld nugget 50 produced by the welding process has a length approximately equal to, or somewhat greater than, the thickness of the impeller housing or converter cover. By controlling the power supplied to the welder and the speed of movement of the first and second sheets with respect to the welding beam, the end of weld nugget 50 is located in the second sheet and the nugget extends into the first sheet as shown in FIGS. 5 and 6.

If the angle of incidence of the welding beam with respect to the datum plane is low, the welding beam first contacts edge 32, but if the angle of incidence is relatively large, the welding beam first contacts the outer surface 52 of sheet 34. In either instance, the focal point of the welding beam is located on sheet 34 between the inner surface 38 and the mean thickness of sheet 34, preferably at a point approximately one-third of the distance from the surface 38 to surface 52. Locating the focal point in this way assures the material of sheet 34 in the vicinity of surface 38 has a higher temperature than the material adjacent surface 52. Furthermore, a temperature gradient B is established through the thickness of the first sheet and a temperature gradient C will be established through the thickness of the second sheet 36. The welding beam raises substantially, but locally, the average temperature of the first and second sheets, thereby increasing their thicknesses and reducing the width of the initial gap. Moreover, because the outer surface of the first sheet has a lower temperature than its inner surface in the weld vicinity, the tendency of the first sheet to expand circumferentially and to move radially outward from its initial position before heating is restrained by the effect of a thermal bending moment $M_{T1}$ tending to cause bending through the thickness of the first sheet. FIG. 5 shows the direction sense of this bending moment. The bending moment induced by heating sheet 34 and locating the focal point as described above prevents as much radial expansion of the first sheet as would occur if the temperature gradient B did not exist. If the focal point were located in the vicinity of the mean thickness of the first sheet, gradient B would be substantially less, i.e., the temperature through the thickness of the first sheet would be more uniform and more nearly symmetric about the midplane of sheet 34, the corresponding thermal moment would be lower, and radial expansion of the first sheet away from the second sheet would be greater.

Figures 5, 6:
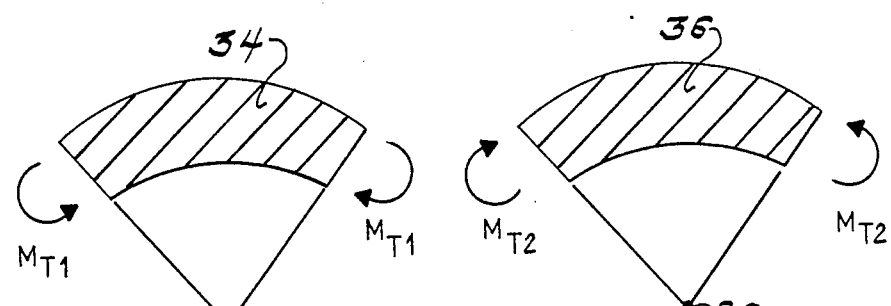
FIGS. 5 and 6 are cross sections taken at planes 5—5 and 6—6 of FIG. 2.

Similarly, temperature gradient C through the thickness of the second sheet 36 induces a thermal bending moment $M_{T2}$ in the second sheet, as shown in FIG. 6, tending to increase radial expansion toward first sheet 34 and gap A in comparison to the radial expansion that would result if gradient C were absent.

Therefore, the increase in means temperature near the weld of the first and second sheets, and presence of the thermal bending moments induced in the first sheet and second sheet combine to reduce, and preferably to eliminate, the gap that exists before welding begins between the first and second sheets.

The seam around the periphery of the impeller housing is produced by slowly rotating or otherwise moving the first and second sheets relative to the welding beam at a rate of approximately 50–80 inches per minute. In this way, molten metal produced in the first and second sheets by the welding beam fuse and complete the weld along the entire seam. The welded nugget produced by this process is directed substantially parallel to the axis of the welding beam and has the configuration shown in FIGS. 3 and 4.

Having described a preferred embodiment of our invention, what we claim and desire to secure by U.S. Letters Patent is:

1. A method for welding first and second sheets having a gap between the sheets before welding, comprising the steps of:
    arranging the sheets so that the first sheet overlaps the second sheet and defines an edge located near the overlap and directed at a large angle relative to the first sheet or second sheet;
    directing a welding beam at the first sheet toward said edge at a relatively shallow angle with respect to the first sheet in the vicinity of the overlap;
    locating the focal point of the welding beam on the first sheet; and
    heating the sheets with the welding beam so that thermal expansion of the sheets reduces the gap and welds the sheets.

2. The method of claim 1 wherein locating the focal point of the welding beam includes locating said focal point between the inner surface of the first sheet and the midthickness of the first sheet and at a distance from said edge so that the weld nugget produced is approximately equal to the wall thickness of the first sheet or second sheet.

3. The method of claim 1 wherein locating the focal point of the welding beam includes locating said focal point between the inner surface of the first sheet and the midthickness of the first sheet.

4. The method of claim 1 wherein locating the focal point of the welding beam includes locating said focal point approximately one-half of the distance from the inner surface of the first sheet and the midthickness of the first sheet.

5. The method of claim 1 further comprising moving the sheets with respect to the welding beam while maintaining the relative positions of the sheets, thereby welding the sheets along a length.

6. The method of claim 1 further comprising rotating the sheets with respect to the welding beam about an axis while maintaining the relative positions of the sheets, thereby welding the sheets along a length.

7. The method of claim 1 wherein the welding beam is produced by a welder supplied with electric power in the range 5–15 kilowatts.

8. The method of claim 1 wherein said shallow angle is in the range 10–45 degrees.

9. The method of claim 1 wherein the length of the seam is transverse to the edge and the focal point of the welding beam is located on the first sheet a sufficient distance from said edge that the length of a weld nugget produced when viewed in a direction substantially perpendicular to the length of the seam is equal to or greater than the thickness of the first sheet or second sheet at the overlap.

10. The method of claim 1 wherein the weld is made without filler material.

11. The method of claim 5 wherein the sheets are moved with respect to the welding beam at a rate in the range 50–80 inches per minute.

12. A method for welding first and second sheets having a gap between the sheets before welding, comprising the steps of:
    arranging the sheets so that the first sheet overlaps the second sheet;
    directing a welding beam at the first sheet at a relatively shallow angle with respect to the first sheet in the vicinity of the overlap;
    locating the focal point of the welding beam on the first sheet; and heating the sheets with the welding beam so that thermal expansion of the sheets reduces the gap and welds the sheets.

13. The method of claim 12 wherein locating the focal point of the welding beam includes locating said focal point between the inner surface of the first sheet and the midthickness of the first sheet.

14. The method of claim 12 wherein locating the focal point of the welding beam includes locating said focal point approximately one-half of the distance from the inner surface of the first sheet and the midthickness of the first sheet.

15. The method of claim 12 further comprising moving the sheets with respect to the welding beam while maintaining the relative positions of the sheets, thereby welding the sheets along a length.

16. The method of claim 12 further comprising rotating the sheets with respect to the welding beam about an axis while maintaining the relative positions of the sheets, thereby welding the sheets along a length.

17. The method of claim 12 wherein the welding beam is produced by a welder supplied with electric power in the range 5–15 kilowatts.

18. The method of claim 12 wherein said shallow angle is in the range 10–45 degrees.

19. The method of claim 12 wherein the length of the seam is transverse to the edge and the focal point of the welding beam is located on the first sheet and the length of a weld nugget produced when viewed in a direction substantially perpendicular to the length of the seam is equal to or greater than the thickness of the first sheet or second sheet at the overlap.

20. The method of claim 12 wherein the weld is made without filler material.

21. The method of claim 15 wherein the sheets are moved with respect to the welding beam at a rate in the range 50–80 inches per minute.

* * * * *